Jan. 22, 1935. W. GLADHORN ET AL 1,988,550
SUPPORTS MADE OF CELLULOSE DERIVATIVES FOR USE IN THE MANUFACTURE
OF SHEETS OF MATERIAL SOLUBLE IN ORGANIC SOLVENTS
Filed June 4, 1932

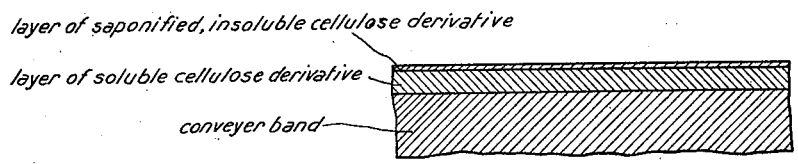

layer of saponified, insoluble cellulose derivative
layer of soluble cellulose derivative
conveyer band

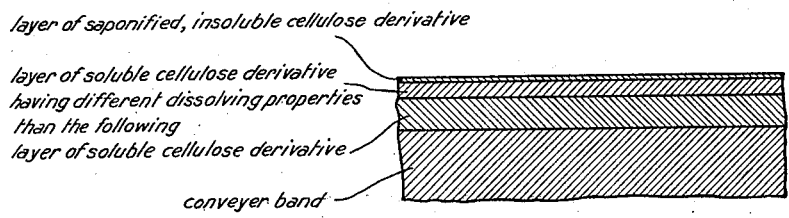

layer of saponified, insoluble cellulose derivative
layer of soluble cellulose derivative having different dissolving properties than the following
layer of soluble cellulose derivative
conveyer band Inventors:
Werner Gladhorn,
Leopold Eckler,
By Attorney
Philip S. Hopkins.

Patented Jan. 22, 1935

1,988,550

UNITED STATES PATENT OFFICE 1,988,550

SUPPORTS MADE OF CELLULOSE DERIVATIVES FOR USE IN THE MANUFACTURE OF SHEETS OF MATERIAL SOLUBLE IN ORGANIC SOLVENTS

Werner Gladhorn, Dessau in Anhalt, Germany, and Leopold Eckler, Binghamton, N. Y., assignors to Agfa Ansco Corporation, Binghamton, N. Y., a corporation of New York Application June 4, 1932, Serial No. 615,428
In Germany October 16, 1926

18 Claims. (Cl. 18—15)

The present invention relates to a new article of manufacture to be used in the production of films as a support for the solution from which the film is formed, and more particularly to a support consisting of a layer of a cellulose derivative, the surface of said layer being insoluble and unswellable in the solvents contained in the said solution.

It is a continuation in part of our application Serial Number 227,043, filed October 18, 1927.

One of its objects is to provide a process of obtaining such supports. Another object is the support obtainable by this process. Further objects will be seen from the detailed specification following hereafter.

It is common practice in the art to make sheets of any thickness from certain materials by causing a solution of said material in an organic solvent to flow on a support which consists of a layer of a cellulose derivative. In consequence of the great sensitiveness of cellulose derivatives to the organic solvents used in making the solution which is to flow, the process involves considerable difficulty. The solvent used has a swelling or solvent action on the cellulose derivative support; thus the smoothness of the support and therefore also that of the sheet produced is affected. Furthermore, the solidified sheet can be separated from the support only with difficulty because the solvent has brought about to some extent an interunion between the support and the sheet.

In order to avoid these difficulties it has been proposed to use as the support such cellulose derivatives which are as different as possible from the material from which the sheet is to be made with respect to their solubility in the solvents used. For example, supports of cellulose ethers have been used for receiving a solution of nitro-cellulose for the purpose in question. This expedient, however, does not afford supports of sufficient resistance because in spite of the differences which exist between the several esters and ethers of cellulose there still takes place an attack of any such support by the solvent sufficient to prevent the production of a perfect sheet.

The present invention consists in changing by a suitable treatment the surface of the support consisting of a cellulose derivative that the latter is no longer liable to swell or to dissolve in the organic solvents usually employed for making the casting dope.

A treatment which produces the desired effect consists in superficially saponifying the cellulose derivative forming the support or changing in any other way the chemical properties of the latter. Thus, the treatment according to the invention of supports consisting of a cellulose ether or a cellulose ester produces a superficial layer which consists wholly or to the greater part of regenerated cellulose and differs in its solubility relationships from the cellulose esters and cellulose ethers to such an extent that the surface of the support remains practically unaffected by the usual organic solvents suitable for dissolving cellulose derivatives. Of the numerous cellulose derivatives which are suited for being used in making supports for casting films, nitrocellulose and cellulose acetate have proved to be of particular importance. These materials may be used in form of the wastes which are produced in the manufacture of films and so on. The surface treatment may be effected with any suitable agent, but ammonium sulfhydrate or sulfuric acid are preferred for saponifying nitrocellulose and caustic alkalis for the saponification of cellulose acetate. The agents are generally applied in their aqueous or alcoholic solution or in mixtures of alcohols and water. The concentration depends essentially upon the efficiency of the agent, the duration of treatment and the progress of the attack. When using alkaline agents a concentration between 2 and 10 per cent will be sufficient in most cases, when saponifying nitrocellulose with sulfuric acid a concentration of 80-90 per cent will be employed, however, our invention is not limited to these concentrations. A superficial saponification will often be sufficient but then the surface is very easily injured, thus we prefer to produce a saponified layer of about 10 to 20 $\mu$ thickness, however the saponification may be carried farther, if desired.

The production of the casting support and of the films is done according to known methods. The surface of the conveyor band of a casting machine preferably consisting of metal, for instance, copper is provided with a coating of the cellulose derivative used by flowing a solution of said cellulose derivative onto it. After evaporation the cellulose derivative is subjected to the treatment with the saponifying agent. This treatment is effected by partially or wholly passing the band provided with its coating through the solution of saponifying agent, or by spraying this solution on the coating, or by any other means known in the art. After the treatment is complete the adherent solution of saponifying agent, or of salt formed in the treatment, is removed by washing with water. After drying the sheets, for instance, photographic films and the like may be cast in the usual way.

According to another mode of the invention there may be first cast a layer of, for instance, nitrocellulose or cellulose acetate onto the belt or casting surface and on this coating another coating of the same material or another material may be applied, but having other dissolving properties. So, for instance, a basic coating of a cellulose acetate containing about 52 to 56 per cent of acetic acid and being soluble in acetone may be applied to the conveyor band and upon this layer there may be provided a coating of cellulose triacetate insoluble in acetone, but soluble in chloroform, or a coating of cellulose acetate containing about 45 to 47 per cent of acetic acid and being soluble in acetone only after an addition of about 15 to 30 per cent of water. In this case the surface layer is subjected to the saponifying treatment. The arrangement has the advantage that the basic coating which must have a certain thickness can be provided with a coating which is easily removable when damaged and is less thick.

The saponified layer does not wholly consist of regenerated cellulose. Only the surface of this layer may be of pure cellulose hydrate. In any case the saponification must be carried on so far that the surface of the casting support does not swell under the influence of the solvents of the solution to be cast. Furthermore the saponified layer has not a homogeneous composition. The content of, for instance, acetic acid of the different strata increases steadily from the surface layer towards the belt proper.

The accompanying drawing shows in cross section on an exaggerated scale two embodiments of our invention and is in itself explanatory.

The following examples serve to illustrate our invention.

*Example 1.*—A solution of nitrocellulose containing about 10 to 12% of nitrogen in acetone is applied in known manner to the copper belt of a casting machine so as to form a coating of 0.5 mm. thickness. The conveyor band is then passed for about 1 hour through an aqueous solution of ammonium sulfhydrate of 10 per cent strength. Hereafter it is washed with water. After drying the coating has a saponified surface layer of about 15 μ thickness. Films can be cast on this support in the usual manner.

*Example 2.*—A solution of cellulose acetate containing about 52 to 56 percent of acetic acid is applied in known manner to the conveyor band of a casting machine so as to form a coating of about 0.5 mm. thickness. After drying it is subjected to the action of a 10 percent solution of caustic potash in methanol for about 5 to 10 minutes. Hereafter the remaining lye and the salt formed during the saponification are removed by washing with water. The casting support thus prepared is dried with heated air. The saponified layer has a thickness of about 20 μ.

*Example 3.*—A coating of cellulose acetate of about 0.5 mm. thickness is applied to a metal band as described in Example 1. To this coating there is applied a 10 to 15 per cent solution of cellulose acetate containing about 45 per cent of acetic acid and dissolved in acetone of about 85 per cent strength, so as to form a layer of about 0.2 mm. thickness. After drying the further treatment is effected according to Example 2.

Our invention is not limited to the foregoing examples or to the specific details given therein. Numerous other embodiments are possible and we contemplate, as included within our invention, all such modifications and equivalents as fall within the scope of the appended claims.

What we claim is:

1. In the process of manufacturing sheets the steps which comprise coating the conveyor band of a casting machine with a layer of a cellulose derivative soluble in organic solvents, and reducing the solubility of the surface strata of said layer in organic solvents by subjecting said surface to a chemical treatment adapted to chemically alter said surface.

2. In the process of manufacturing sheets the steps which comprise coating the conveyor band of a casting machine with a layer of a cellulose derivative soluble in organic solvents, and saponifying the surface strata of said layer.

3. In a process of making a support of cellulose derivative for use in the manufacture of sheets of material soluble in organic solvents involving the steps of applying to a conveyor band of a casting machine an initial layer of a cellulose derivative soluble in organic solvents and applying thereover an external layer of a cellulose derivative which is sensitive to the organic solvents used in making the solution which is to be cast thereover, the improvement which consists in reducing the solubility of the surface strata of the external layer in organic solvents by subjecting said surface to a chemical treatment designed to chemically alter said surface.

4. In a process of making a support of cellulose derivative for use in the manufacture of sheets of material soluble in organic solvents involving the steps of applying to a conveyor band of a casting machine an initial layer of a cellulose derivative soluble in organic solvents and applying thereover an external layer of a cellulose derivative which is sensitive to the organic solvents used in making the solution which is to be cast thereover, the improvement which consists in saponifying the surface strata of said external surface layer.

5. Improved process as defined in claim 3, characterized in that the external layer consists essentially of cellulose acetate soluble in organic solvents.

6. Improved process as defined in claim 3, characterized in that the external layer consists essentially of nitrocellulose soluble in organic solvents.

7. In the process of manufacturing sheets the steps which comprise coating the conveyor band of a casting machine with a layer of nitrocellulose soluble in organic solvents, and saponifying the surface strata of said layer.

8. In the process of manufacturing sheets the steps which comprise coating the conveyor band of a casting machine with a layer of a cellulose acetate soluble in organic solvents, and saponifying the surface strata of said layer.

9. In the process of manufacturing sheets the steps which comprise applying to the copper belt of a casting machine a solution of nitrocellulose containing about 10 to 12 per cent of nitrogen in acetone, so as to form after drying a coating of about 0.5 mm. thickness, treating said coating for about 1 hour with a 10 per cent solution of ammonium sulfhydrate, washing said treated coating and drying the same.

10. In the process of manufacturing sheets the steps which comprise applying to the copper belt of a casting machine a solution of cellulose acetate containing about 52–56 per cent of acetic acid, so as to form after drying a coating of about 0.5 mm thickness, treating said coating for about 5 to 10 minutes with a 10 per cent solution of caustic potash in methanol, washing said treated coating with water and drying the same.

11. In the process of manufacturing sheets the steps which comprise applying to the copper belt of a casting machine a solution of cellulose acetate containing about 52–56 per cent of acetic acid, so as to form after drying a first coating of about 0.5 mm thickness, applying to said first coating a 10 to 15 per cent solution of cellulose acetate containing about 45 per cent of acetic acid and dissolved in acetone of about 85 per cent strength so as to form after drying a second coating of about 0.2 mm thickness, treating said second coating for about 5 to 10 minutes with a 10 per cent solution of caustic potash in methanol, washing said treated coating with water and drying the same.

12. In the process of manufacturing sheets the steps which comprise coating the conveyor band of a casting machine with a layer of nitrocellulose soluble in organic solvents, and treating the surface strata of said layer with ammonium sulfhydrate.

13. A casting support comprising a conveyor band carrying an external layer of a cellulose derivative the surface strata of which layer have been chemically treated to reduce the solubility of said surface strata in organic solvents.

14. A casting support comprising a conveyor band carrying an external layer of a cellulose derivative the surface strata of which layer have been saponified.

15. A casting support comprising a conveyor band carrying an external layer of nitrocellulose the surface strata of which layer have been saponified.

16. A casting support comprising a conveyor band carrying an external layer of cellulose acetate the surface strata of which layer have been saponified.

17. A casting support comprising a conveyor band, a layer of a cellulose derivative firmly adhering to said conveyor band and on said layer an outer layer of a cellulose derivative having a solubility different from that of the cellulose derivative constituting said first named layer, said outer layer comprising an internal stratum firmly adhering to said first named layer and an external stratum of saponified cellulose derivative integral with said internal stratum.

18. A casting support comprising a conveyor band, a layer of cellulose acetate firmly adhering to said conveyor band and on said layer an outer layer of cellulose acetate having a solubility different from that of the cellulose acetate constituting said first named layer, said outer layer comprising an internal stratum firmly adhering to said first named layer and an external stratum of saponified cellulose acetate integral with said internal stratum.

WERNER GLADHORN.
LEOPOLD ECKLER.